United States Patent [19]
Emkey

[11] Patent Number: 5,559,633
[45] Date of Patent: Sep. 24, 1996

[54] OPTICAL ISOLATOR WITH REDUCED RELATIVE WALK-OFF

[75] Inventor: William L. Emkey, Bethlehem, Pa.

[73] Assignee: Lucent Technologies Inc., Murray Hill, N.J.

[21] Appl. No.: 543,692

[22] Filed: Oct. 16, 1995

Related U.S. Application Data

[63] Continuation of Ser. No. 151,444, Nov. 12, 1993, abandoned.

[51] Int. Cl.⁶ .............................. G02B 5/30; G02B 27/28
[52] U.S. Cl. ..................... 359/484; 359/281; 359/496; 385/36; 372/703
[58] Field of Search ........................... 359/281, 282, 359/283, 484, 496, 298, 301, 303, 494, 497; 372/703; 385/36, 73

[56] References Cited

U.S. PATENT DOCUMENTS

| | | | |
|---|---|---|---|
| 4,548,478 | 10/1985 | Shirasaki | 350/377 |
| 5,000,546 | 3/1991 | Saito et al. | 359/484 |
| 5,033,830 | 7/1991 | Jameson | 350/403 |
| 5,034,950 | 7/1991 | Jackel et al. | 372/703 |
| 5,105,307 | 4/1992 | Nishiyama et al. | 359/484 |

FOREIGN PATENT DOCUMENTS

| | | | |
|---|---|---|---|
| 0533398 | 3/1993 | European Pat. Off. | G02F 1/09 |
| 55-76322 | 6/1980 | Japan | 359/484 |
| 61-20016 | 1/1986 | Japan | 359/484 |
| 61-45219 | 3/1986 | Japan | 359/484 |
| 61-130921 | 6/1986 | Japan | 359/484 |
| 61-130920 | 6/1986 | Japan | 359/484 |
| 61-156220 | 7/1986 | Japan | 359/484 |
| 63-293519 | 11/1988 | Japan | 359/484 |
| 5-313094 | 11/1993 | Japan | 372/703 |
| 6-27417 | 2/1994 | Japan | 372/703 |
| 6-175069 | 6/1994 | Japan | 372/703 |

OTHER PUBLICATIONS

EPO Search Report, W. L. Emkey 5,94308081.2, Feb. 2, 1995.
Emkey, W. L. et al; Proceedings of the Optical Fiber Conference 1989, Houston, Texas.
Shirasaki, M. & Asama, K.; Applied Optics, vol. 21, No. 23, Dec. 1, 1982 pp. 4296–4299 "Compact Optical Isolator for Fibers Using Birefringent Wedges".

Primary Examiner—Paul M. Dzierzynski
Assistant Examiner—Darren E. Schuberg
Attorney, Agent, or Firm—Michael J. Urbano

[57] ABSTRACT

An optical isolator comprises a non-reciprocal rotator disposed between a pair of birefringent wedges, an input wedge and an output wedge. In order to reduce walk-off between the ordinary and extraordinary rays at the output of the isolator in one embodiment, the input signal is made incident on the input wedge at an angle above the normal to the wedge. At a particular angle related to various parameters of the isolator the relative walk-off can be reduced to essentially zero. In another embodiment, the input angle and various isolator parameters are mutually adapted so that the ordinary and extraordinary rays intersect within the isolator.

6 Claims, 2 Drawing Sheets

OPTICAL ISOLATOR WITH REDUCED RELATIVE WALK-OFF

CROSS REFERENCES TO RELATED APPLICATIONS

This application is a continuation of patent application Ser. No. 08/151444, filed on Nov. 12, 1993 now abandoned. This application was filed concurrently with application Ser. No. 08/151,092 entitled "OPTICAL ISOLATOR WITH REDUCED WALK-OFF".

BACKGROUND OF THE INVENTION

The present invention relates to an optical isolator designed to reduce the displacement (walk-off) between the ordinary and extraordinary rays transmitted through the isolator.

Reflections in optical systems often generate noise and optical feedback which may degrade the performance of various system components, particularly signal sources such as semiconductor lasers and fiber amplifiers. Therefore, the ability to optically isolate lasers and other sensitive components from these reflections is often critical to the performance of the system. In general, a conventional optical isolator comprises a non-reciprocal rotator (e.g., 45° Faraday rotator encased within a bias magnet) disposed between a pair of polarization selectors (e.g., linear polarizers, birefringent plates, or birefringent wedges). Input signals passing through the isolator in the transmitting, forward direction are essentially fully coupled through the polarization selector and Faraday rotator to the output device (e.g., fiber). However, the polarization of reflected signals passing through the isolator in the reflecting, reverse direction is rotated such that essentially none of the reflections are coupled back into the signal source.

In many important system applications, in particular those where the polarization of the signals cannot be fully controlled throughout the system (e.g., in most fiber optic systems), it is important that the isolator operate effectively regardless of the polarization state of the signal.

A common isolator design which addresses this problem includes a Faraday rotator slab disposed between a pair of birefringent wedges. See, for example, W. Emkey et al., *Proc. OFC*, Abstract THF2 (1989). The input signal is incident on the oblique surface of the input wedge at essentially the wedge angle. (For comparison purposes, we note that this incident angle is measured below the normal to the oblique surface; that is, from the normal toward the thicker end of the wedge.)

Although this design may be polarization independent under certain conditions, it does exhibit a phenomenon called relative walk-off. That is, the input signal splits into ordinary and extraordinary rays which are displaced from one another at the isolator output. When the output is lensed into an aperture (e.g., a fiber core), the power coupled into the fiber from each ray can be different, and the total coupled power is less than that possible if the relative walk-off did not occur.

Thus, a need remains in the optical isolator art for a technique which reduces walk-off between the ordinary and extraordinary rays.

SUMMARY OF THE INVENTION

In accordance with one aspect of the invention, an optical isolator comprises a non-reciprocal rotator disposed between a pair of birefringent wedges (an input wedge and an output wedge). In order to reduce walk-off between the ordinary and extraordinary rays at the output of the isolator (relative walk-off), the input signal is made incident on the isolator at an angle above the normal; that is, at an angle measured from the normal to the oblique surface of the input wedge toward the thinner end of the wedge. At a particular angle related to various parameters of the isolator the relative walk-off can be reduced to essentially zero.

Viewed from another aspect, the invention is an optical isolator in which the direction of the input signal and various parameters of the isolator are mutually adapted so that the paths of the ordinary and extraordinary rays intersect within the isolator in such a way as to reduce relative walk-off.

BRIEF DESCRIPTION OF THE DRAWINGS

The invention, together with its various features and advantages, can be readily understood from the following more detailed description taken in conjunction with the accompanying drawing, in which.

The figures are not drawn to scale and, in particular, the various angles, dimensions, and light ray directions are exaggerated in order to improve clarity. For example, the angles of refraction at surface 14.1 are exaggerated for clarity.

DETAILED DESCRIPTION

Figure 1:
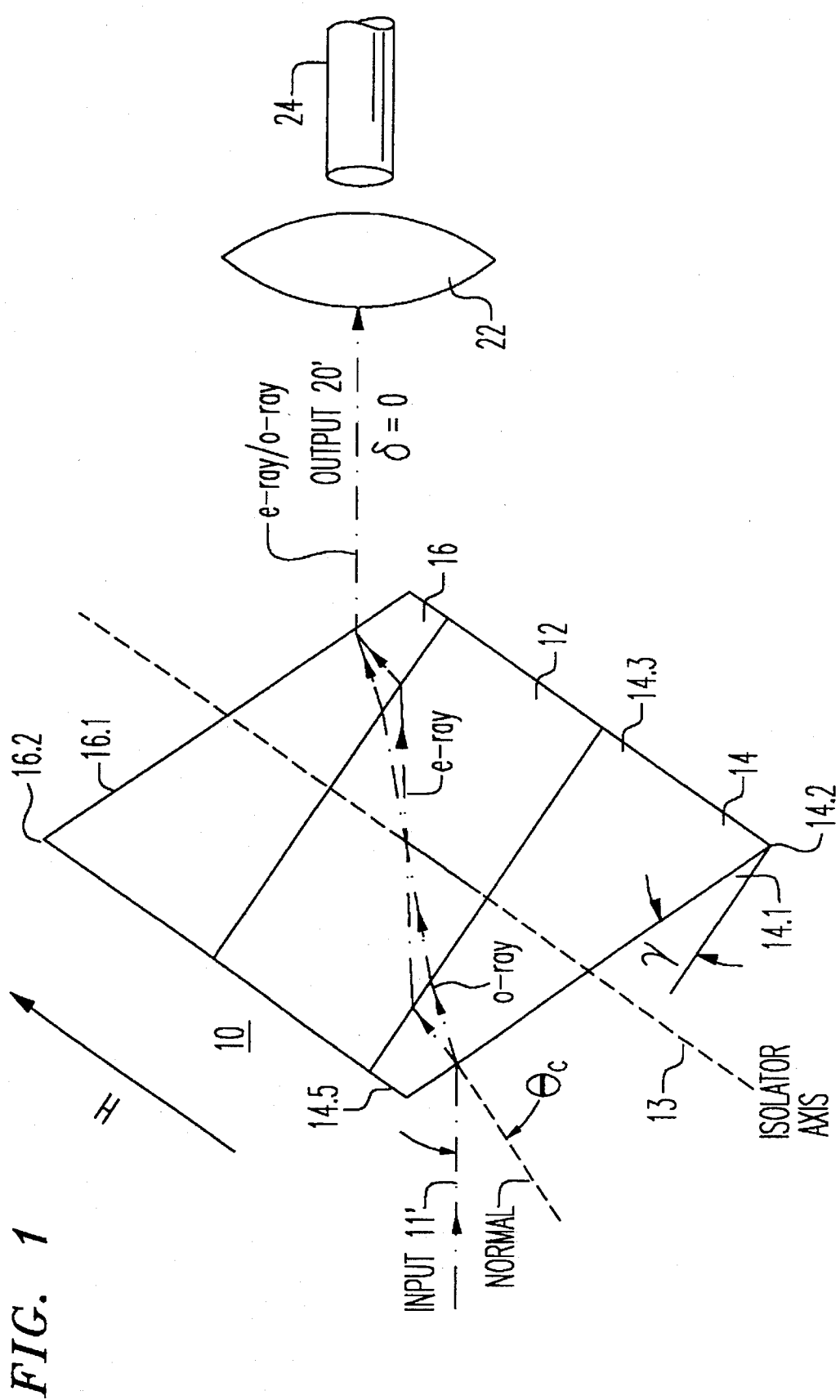
FIG. 1 is a schematic, cross-section of a portion of an optical isolator which exhibits reduced relative walk-off in accordance with one embodiment of the invention.
Figure 2:
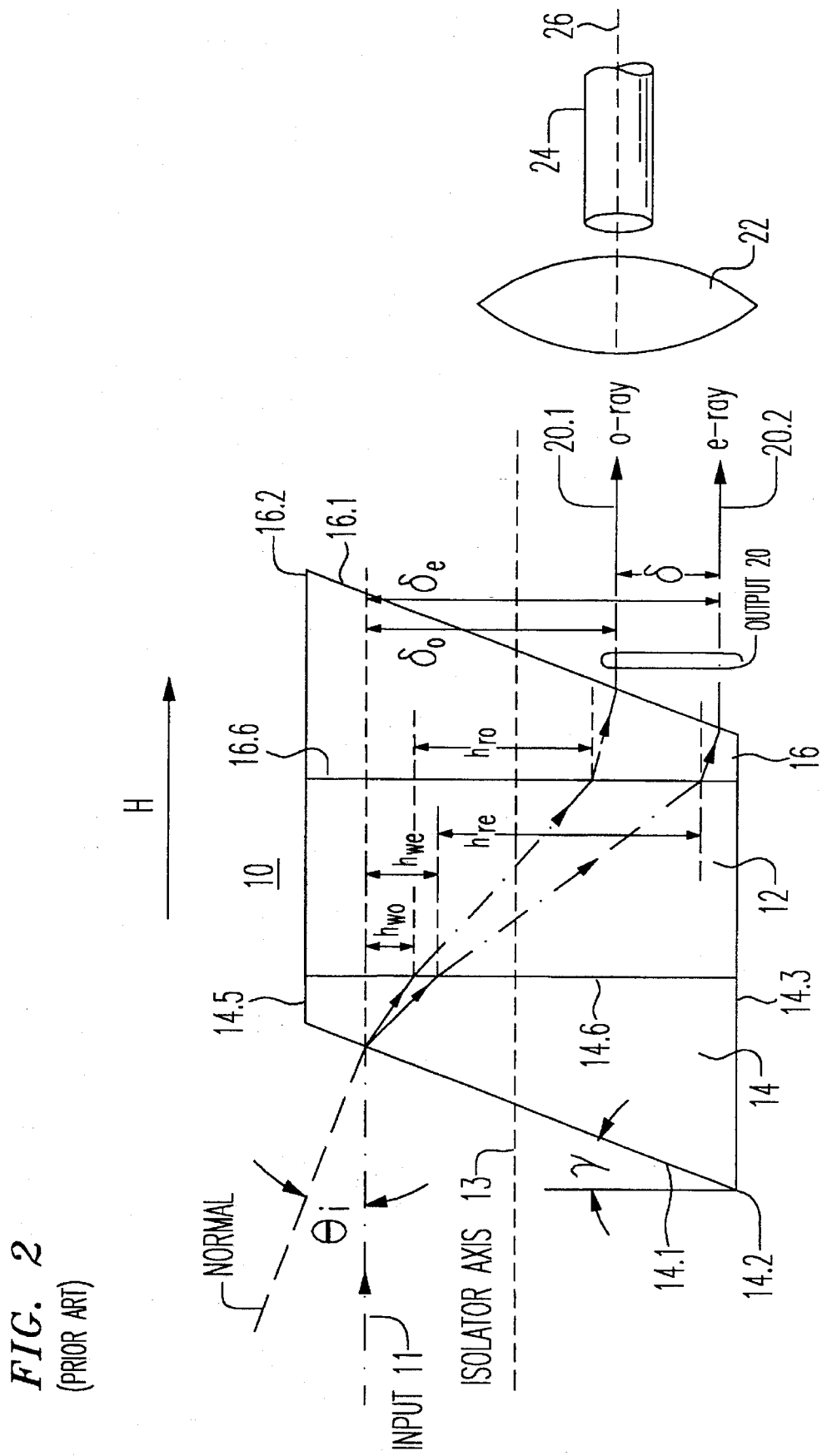
FIG. 2 is a schematic, cross-section of a portion of a prior art optical isolator which exhibits relative walk-off; i.e., displacement $\delta$ between the ordinary ray (o-ray) and the extraordinary ray (e-ray).

FIGS. 1 and 2 illustrate optical isolators 10 in which three basic components are disposed in tandem on the isolator axis 13: a pair of birefringent (e.g., ruffle, calcite) wedges 14, 16 and a non-reciprocal (e.g., Faraday) rotator slab 12 located between the wedges. Illustrative Faraday rotator materials include thin film garnets. It is to be understood that in actual operation such isolators typically utilize a permanent magnet to generate a magnetic field H and may include lensing elements and antireflection coatings, all of which are well known in the art. For the sake of clarity, the magnets and coatings are not shown and are not considered as necessary for an understanding of the operation of the isolator in accordance with the teachings of the present invention. The lensing elements are depicted schematically by lens means 22 which focuses the output signal of the isolator into an aperture such as the core of optical fiber 24. Birefringent wedges 14, 16 have their optical axes (C-axes; not shown) oriented at 45° to one another. For example, wedge 14 may have its C-axis located in the plane of oblique input face 14.1 and oriented at an angle of +22.5° with respect to a side edge of the oblique surface 14.1. Similarly, wedge 16 may have its C-axis located in the plane of output face 16.1 and oriented at an angle of −22.5° with respect to the corresponding side edge of oblique surface 16.1. Faraday rotator 12, as is well-known in the art, is designed to provide a nonreciprocal polarization rotation of 45° to an optical signal passing through it. Thus, an input optical signal will pass through isolator 10 from left to right relatively unimpeded, while a reverse (e.g., reflected) optical signal traveling from right to left will be deflected by isolator 10 in a manner which prevents it from entering the source (not shown) of the input signal 11.

As shown in FIG. 2, in typical prior art optical isolators of the two-wedge design, the input signal is incident on input wedge 14 at an angle $\theta_i$ below the normal to oblique surface 14.1; that is, $\theta_i$ is measured from the normal toward the thicker end 14.3 of the input wedge 14. This type of isolator is shown in the Erakey, et al., abstract, supra. Because the wedge 14 is birefringent, its refractive indices $n_o$ and $n_e$ are different for the ordinary ray (o-ray) and extraordinary ray (e-ray), respectively, of the input signal; e.g., at $\lambda=1.5$ μm $n_e=2.71$ and $n_o=2.45$ for a ruffle wedge. Consequently, the e-ray has a slightly longer path length through the isolator than the o-ray. As a result, the output signal 20, emanating from oblique surface 16.1 of output wedge 16 (parallel to oblique surface 14.1), comprises two separate rays: an o-ray 20.1 and an e-ray 20.2 parallel to and displaced from one another by a distance $\delta$. Note also that the o-ray and e-ray, as shown, typically are not symmetrically positioned relative to the common axis 26 of the lens means 22 and fiber 24.

When the beam formed by these separated rays in FIG. 2 is focussed by lens means 22 onto the core of fiber 24, the power coupled into the fiber 24 from the e-ray 20.2 can be different from that of o-ray 20.1 because the magnitudes of the incidence angles of these rays on the core can be different from one another. This difference in coupling results in polarization dependent loss (PDL) and is a disadvantage in many applications. The reduction of PDL is addressed by the present invention.

One embodiment of the invention shown in FIG. 1 utilizes a two-wedge, single-rotator arrangement of elements of the type depicted in FIG. 2. Consequently, corresponding elements have been given the same reference numbers to facilitate comparison. An important difference, however, resides in the fact that input signal 11' is not incident on wedge 14 at an angle below the normal. Instead, the input signal is incident at an angle $\theta_c$ above the normal to the oblique input surface 14.1 of wedge 14; that is, $\theta_c$ is measured from the normal toward the thinner end 14.5 of the input wedge 14. When $\theta_c$ is properly chosen, in accordance with the description which follows, the e-rays and o-rays at the isolator output are coincident ($\delta=0$) as shown by output signal 20'. Thus, PDL is substantially reduced when signal 20' is coupled through lens means 22 into fiber 24.

Viewed from another aspect, relative walk-off and PDL are reduced by mutually adapting $\theta_c$ and various isolator parameters such that the paths of the e-rays and o-rays intersect in the rotator 12 (FIG. 1). In contrast, in the prior art those paths do not cross (FIG. 2).

The ideal case in which relative walk-off is reduced to zero ($\delta=0$) is derived by ray tracing the e-rays and o-rays through the isolator using Snell's Law at the interfaces and then equating the two orthogonal walk-offs.

The resulting zero walk-off ($\delta=0$) condition can be simplified using small angle approximations to yield equation (1) below:

$$\delta = \Delta n \left[ \frac{2t_w \theta_i}{n_e n_o} + \frac{\gamma t_r}{n_r} \right] = 0, \qquad (1)$$

where $n_r$ is the refractive index of the rotator 12, $\Delta n = n_e - n_o$, $t_w$ and $t_r$ are the thicknesses of the wedges 14, 16 and the rotator 12, respectively, $\gamma$ is the wedge angle shown in FIGS. 1 and 2, and $\theta_i$ is angle the input signal makes with the normal to surface 14.1. Using a single value for the thickness of the wedges is an accurate approximation since $\gamma$ is typically small enough (e.g., 4°–5°) that the thickness does not change appreciably across the beam diameter. Solving for the angle $\theta_c$ at which walk-off is zero yields the following (assuming small angles for simplicity):

$$\theta_c = \theta_i = \gamma \left( \frac{n_e n_o}{n_r} \right) \left( \frac{t_r}{2t_w} \right) \qquad (2)$$

Equations (1) and (2) also assume that the medium adjacent the input wedge is air, a common design. But, there may be advantages to using an incident medium other than air. The equations which reflect this generalized environment are shown in the Appendix.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the invention contemplates applications wherein other than zero relative walk-off may be tolerable; that is, designs in which $\theta_i \neq \theta_c$ yet the input signal is still directed above the normal. Moreover, there may be designs (e.g., those including a compensator) in which the input angle is not above the normal, and yet the e-rays and o-rays intersect in a way so as to reduce PDL. Such designs are within the spirit and scope of the invention.

In addition, for simplicity of illustration and calculation the isolator of FIG. 2 has been shown as if the wedges were necessarily in direct contact with the rotator. In practice, however, there may be gaps between the components, and those gaps may be filled with various materials (e.g., air, epoxy) without departing from the principles of the invention. Finally, we observe that the body identified herein as a wedge need not have a cross-section in the shape of a right triangle (whether truncated as in FIGS. 1–2, or not) or in the shape of any triangle for that matter. The important geometric features of each such body are the two non-parallel surfaces traversed by the light beam (e.g., surfaces 14.1, 14.6 of wedge 14; and surfaces 16.1, 16.6 of wedge 16).

Appendix

The following discussion sets forth the equations utilized to analyze relative walk-off in a two-wedge isolator of the type shown in FIGS. 1 and 2. This analysis, with suitable small angle approximations, leads to equations (1) and (2) for the relative walk-off $\delta$ and the incident input angle $\theta_c$. We begin with definitions: n=refractive index of the incident medium (i.e., the medium adjacent oblique surface 14.1 of input wedge 14).

$n_e$=extraordinary refractive index of the wedges $n_o$=ordinary refractive index of the wedges $n_r$=refractive index of the rotator $\gamma$=the smallest of the three wedge angles $t_w$=effective wedge thickness (a single value is taken since $\gamma$ is so small that there is an insignificantly small variation of $t_w$ across the wedge from the thicker end 14.3 to the thinner end 14.5)

$t_r$=thickness of rotator slab 12

$\theta_i$=angle of incidence that the input signal makes with the normal to the oblique surface 14.1 of the input wedge 14. $\theta_i$ is defined as being positive when $\theta$ is oriented toward the thinner end of the input wedge.

Utilizing Snell's Law at the interfaces crossed by the light rays, we calculate the following:

(3) $\theta_{we} = \sin^{-1}\left(\dfrac{n \sin \theta_i}{n_e}\right) =$ refraction angle of the e-ray at the input wedge surface 14.1.

(4) $\theta_{wo} = \sin^{-1}\left(\dfrac{n \sin \theta_i}{n_o}\right) =$ refraction angle of the o-ray at the input wedge surface 14.1.

(5) $h_{we} = t_w \tan(\gamma + \theta_{we}) =$ walk-off of e-ray in input wedge 14.

(6) $h_{wo} = t_w \tan(\gamma + \theta_{wo}) =$ walk-off of o-ray in input wedge 14.

(7) $\theta_{re} = \sin^{-1}\left[\dfrac{n_e}{n_r} \sin(\gamma + \theta_{we})\right] =$ refraction angle of the e-ray in the rotator 12.

(8) $\theta_{ro} = \sin^{-1}\left[\dfrac{n_o}{n_r} \sin(\gamma + \theta_{wo})\right] =$ refraction angle of the o-ray in the rotator 12.

(9) $h_{re} = t_r \tan\theta_{re} =$ walk-off of e-ray in rotator 12.

(10) $h_{ro} = t_r \tan\theta_{ro} =$ walk-off of o-ray in rotator 12.

(11) $\delta_e = 2h_{we} + h_{re} =$ total e-ray walk-off in traversing both wedges 14, 16 and rotator 12

(12) $\delta_o = 2h_{wo} + h_{ro} =$ total o-ray walk-off in traversing both wedges 14, 16 and rotator 12

(13) $\delta = \delta_e - \delta_o =$ relative walk-off

By way of example, consider the case where the incident medium is air (n=1), the wedges are rutile ($n_e$=2.71; $n_o$=2.454), the rotator is garnet ($n_r$=2.25), $\gamma$=5.25°, $t_w$=750 μm and $t_r$=400 μm. Then, for zero relative walk-off (setting equation (13) to zero), we get $\theta_i = \theta c = 4.2°$ (approximately) above the normal. However, if the incident medium is changed such that n=3.0, then $\theta_i = \theta_c = 1.5°$ (approximately) above the normal for zero relative walk-off.

I claim:

1. An optical isolator comprising first and second birefringent wedges, said first wedge having an input surface positioned to receive an input optical signal and said second wedge having an output surface positioned to emit an output optical signal, a non-reciprocal rotator disposed between said wedges, within said wedges and said rotator said signals being composed of both ordinary rays and extraordinary rays which tend to be displaced from one another in said output signal, CHARACTERIZED IN THAT said input signal is incident on said input surface at an angle above the normal thereto, and said angle is given approximately by $$\theta_c = \gamma \left[\dfrac{n_e n_o}{n_r}\right]\left[\dfrac{t_r}{2t_w}\right],$$

where $\gamma$ is the wedge angle, $n_e$ and $n_o$ are the refractive indices of the extraordinary and ordinary rays, respectively, in said wedges, $n_r$ is the refractive index in said rotator, $t_r$ is the thickness of said rotator, and $t_w$ is the thickness of each of said wedges.

2. The isolator of claim 1 wherein said angle of the input signal reduces to essentially zero the displacement between said rays.

3. The isolator of claim 2 wherein said input surface is parallel to said output surface.

4. An optical isolator comprising a body of Faraday rotator material having a pair of parallel surfaces, first and second wedges affixed to separate ones of said parallel surfaces, said first wedge having an input surface positioned to receive an input optical signal and said second wedge having an output surface positioned to emit an output optical signal parallel to said input signal, said wedges and said body being disposed along a common axis, within said wedges and said rotator said signals being composed of both ordinary rays and extraordinary rays which tend to be displaced from one another in said output signal, CHARACTERIZED IN THAT said input signal is incident on said input surface at an angle above the normal thereto, and said angle is given approximately by $$\theta_c = \gamma \left[\dfrac{n_e n_o}{n_r}\right]\left[\dfrac{t_r}{2t_w}\right],$$

where $\gamma$ is the wedge angle, $n_e$ and $n_o$ are the refractive indices of the extraordinary and ordinary rays, respectively, in said wedges, nr is the refractive index in said rotator, $t_r$ is the thickness of said rotator, and $t_w$ is the thickness of each of said wedges.

5. An optical isolator comprising first and second birefringent wedges, said first wedge having an input surface positioned to receive an input optical signal and said second wedge having an output surface positioned to emit an output optical signal, a non-reciprocal rotator disposed between said wedges, said signals being composed of ordinary rays and extraordinary rays which tend to be displaced from one another in said output signal, CHARACTERIZED IN THAT the angle which said input signal makes with said input surface and the said wedges and said rotator are mutually adapted to cause the paths of said ordinary and extraordinary rays to intersect one another within said rotator.

6. The isolator of claim 5 further characterized in that said input signal is incident on said input surface at an angle above the normal thereto.

* * * * *